United States Patent
Widener et al.

(10) Patent No.: US 10,337,739 B2
(45) Date of Patent: Jul. 2, 2019

(54) COMBUSTION BYPASS PASSIVE VALVE SYSTEM FOR A GAS TURBINE

(71) Applicant: General Electric Company, Schenectady, NY (US)

(72) Inventors: Stanley Kevin Widener, Greer, SC (US); Carlos Miguel Miranda, Greer, SC (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 15/237,795

(22) Filed: Aug. 16, 2016

(65) Prior Publication Data

US 2018/0051882 A1    Feb. 22, 2018

(51) Int. Cl.
| | |
|---|---|
| F23R 3/26 | (2006.01) |
| F02C 9/18 | (2006.01) |
| F23R 3/06 | (2006.01) |
| F23R 3/00 | (2006.01) |
| F23N 3/04 | (2006.01) |
| F23N 5/02 | (2006.01) |
| F23N 5/04 | (2006.01) |

(52) U.S. Cl.
CPC ............... *F23R 3/26* (2013.01); *F02C 9/18* (2013.01); *F23N 3/047* (2013.01); *F23N 5/027* (2013.01); *F23N 5/047* (2013.01); *F23R 3/002* (2013.01); *F23R 3/06* (2013.01); *F05D 2240/40* (2013.01); *F05D 2260/606* (2013.01); *F05D 2270/082* (2013.01)

(58) Field of Classification Search
CPC ...... F23R 3/26; F23R 3/002; F23R 3/06; F02C 9/18; F02C 6/08; F23N 3/047; F23N 5/027; F23N 5/047
See application file for complete search history.

(56) References Cited

U.S. PATENT DOCUMENTS

| | | | |
|---|---|---|---|
| 799,256 | A | 9/1905 | Parker |
| 2,659,198 | A | 11/1953 | Cook |
| 2,787,440 | A | 4/1957 | Thompson, Jr. |
| 2,880,579 | A | 4/1959 | Harshman |
| 3,004,494 | A | 10/1961 | Corbett |

(Continued)

FOREIGN PATENT DOCUMENTS

| | | |
|---|---|---|
| EP | 0391288 B1 | 5/1994 |
| EP | 1189805 A1 | 3/2002 |

(Continued)

OTHER PUBLICATIONS

U.S. Appl. No. 14/983,774, Office Action dated Jul. 10, 2018, 283683-1 (GEEN-0742-US), 46 pages.

(Continued)

*Primary Examiner* — Andrew H Nguyen
(74) *Attorney, Agent, or Firm* — Dale Davis; Hoffman Warnick LLC

(57) ABSTRACT

A combustor for a gas turbine, including: a combustor chamber; a casing enclosing the combustor chamber and defining an area therebetween for passing compressor discharge air into the combustor chamber for use in combustion; and at least one passive bypass valve for selectively extracting a portion of the compressor discharge air from the area between the combustor chamber and the casing to adjust a temperature in the combustor.

16 Claims, 6 Drawing Sheets

(56) References Cited

U.S. PATENT DOCUMENTS

| | | | |
|---|---|---|---|
| 3,733,816 | A | 5/1973 | Grennan et al. |
| 3,851,998 | A | 12/1974 | Downing |
| 4,159,623 | A | 7/1979 | McReynolds |
| 4,255,927 | A | 3/1981 | Johnson et al. |
| 4,296,599 | A * | 10/1981 | Adamson .............. F02C 7/18 |
| | | | 415/115 |
| 4,807,433 | A * | 2/1989 | MacLin .............. F01D 5/081 |
| | | | 415/115 |
| 5,022,817 | A | 6/1991 | O'Halloran |
| 5,051,065 | A | 9/1991 | Hansen |
| 5,235,812 | A | 8/1993 | Klaass et al. |
| 5,279,109 | A | 1/1994 | Liu et al. |
| 5,349,812 | A | 9/1994 | Taniguchi et al. |
| 5,548,951 | A | 8/1996 | Mumford et al. |
| 5,557,920 | A | 9/1996 | Kain |
| 5,575,616 | A | 11/1996 | Hagle et al. |
| 5,716,423 | A | 2/1998 | Krul et al. |
| 5,737,922 | A | 4/1998 | Schoenman et al. |
| 5,820,589 | A | 10/1998 | Torgerson et al. |
| 5,924,276 | A | 7/1999 | Mowill |
| 5,988,589 | A | 11/1999 | Mowill |
| 6,016,824 | A | 1/2000 | Watanabe |
| 6,021,979 | A | 2/2000 | Bender et al. |
| 6,022,197 | A | 2/2000 | Cygnor et al. |
| 6,050,079 | A | 4/2000 | Durgin et al. |
| 6,226,977 | B1 | 5/2001 | Ichiryu et al. |
| 6,237,323 | B1 | 5/2001 | Ojiro et al. |
| 6,250,066 | B1 | 6/2001 | Lawrence et al. |
| 6,327,845 | B2 | 12/2001 | Ojiro et al. |
| 6,390,733 | B1 | 5/2002 | Burbage et al. |
| 6,416,279 | B1 | 7/2002 | Weigand et al. |
| 6,449,956 | B1 | 9/2002 | Kolman et al. |
| 6,471,675 | B1 | 10/2002 | Rogers |
| 6,568,188 | B2 | 5/2003 | Kolman et al. |
| 6,589,205 | B1 | 7/2003 | Meadows |
| 6,595,098 | B1 | 7/2003 | Wray |
| 6,622,475 | B2 | 9/2003 | Brault et al. |
| 6,860,098 | B2 | 3/2005 | Suenaga et al. |
| 6,892,543 | B2 | 5/2005 | Nakae |
| 6,931,859 | B2 | 8/2005 | Morgan et al. |
| 6,979,315 | B2 | 12/2005 | Rogers et al. |
| 7,000,396 | B1 | 2/2006 | Storey |
| 7,200,986 | B2 | 4/2007 | Sanders |
| 7,299,618 | B2 | 11/2007 | Terazaki et al. |
| 7,340,880 | B2 | 3/2008 | Magoshi et al. |
| 7,698,894 | B2 | 4/2010 | Wood et al. |
| 7,744,060 | B2 | 6/2010 | Sneh |
| 7,823,389 | B2 | 11/2010 | Seitzer et al. |
| 7,876,224 | B2 | 1/2011 | Prokopuk |
| 8,267,863 | B2 | 9/2012 | Najafi et al. |
| 8,275,533 | B2 | 9/2012 | Davis, Jr. et al. |
| 8,281,601 | B2 | 10/2012 | McMahan et al. |
| 8,307,662 | B2 | 11/2012 | Turco |
| 8,322,346 | B2 | 12/2012 | Najafi et al. |
| 8,549,864 | B2 | 10/2013 | Langdon, II et al. |
| 8,596,035 | B2 | 12/2013 | Mowill |
| 8,684,660 | B2 | 4/2014 | Miranda et al. |
| 8,966,877 | B2 | 3/2015 | McKinney |
| 9,028,206 | B2 | 5/2015 | Liotta et al. |
| 9,052,115 | B2 | 6/2015 | Stoia et al. |
| 9,097,084 | B2 | 8/2015 | McDougall et al. |
| 2002/0087120 | A1 | 7/2002 | Rogers et al. |
| 2002/0148216 | A1 | 10/2002 | Brault et al. |
| 2005/0159789 | A1 | 7/2005 | Brockway et al. |
| 2005/0187509 | A1 | 8/2005 | Wolf |
| 2006/0016195 | A1 | 1/2006 | Dalla Betta et al. |
| 2006/0042256 | A1 | 3/2006 | Storey |
| 2007/0074516 | A1 | 4/2007 | Peck et al. |
| 2007/0137213 | A1 | 6/2007 | Rickert et al. |
| 2007/0187634 | A1 | 8/2007 | Sneh |
| 2007/0241931 | A1 | 10/2007 | Compton et al. |
| 2007/0266705 | A1 | 11/2007 | Wood et al. |
| 2008/0095652 | A1 | 4/2008 | Jiang |
| 2008/0112798 | A1 | 5/2008 | Seitzer et al. |
| 2008/0269573 | A1 | 10/2008 | Najafi et al. |
| 2009/0005656 | A1 | 1/2009 | Najafi |
| 2009/0148273 | A1 | 6/2009 | Suciu et al. |
| 2009/0243855 | A1 | 10/2009 | Prokopuk |
| 2010/0236249 | A1 | 9/2010 | McMahan et al. |
| 2011/0088405 | A1 | 4/2011 | Turco |
| 2011/0162384 | A1 * | 7/2011 | Langdon, II .......... F01D 17/085 |
| | | | 60/782 |
| 2011/0173984 | A1 | 7/2011 | Valeev et al. |
| 2011/0265486 | A1 | 11/2011 | Plant |
| 2012/0039702 | A1 | 2/2012 | Sharp |
| 2013/0000315 | A1 | 1/2013 | Mowill |
| 2013/0046152 | A1 | 2/2013 | Najafi et al. |
| 2013/0051976 | A1 | 2/2013 | Kirtley |
| 2013/0152582 | A1 | 6/2013 | Anschel et al. |
| 2013/0164157 | A1 | 6/2013 | Roberts et al. |
| 2013/0283807 | A1 | 10/2013 | Stoia et al. |
| 2013/0330168 | A1 | 12/2013 | Liotta et al. |
| 2014/0102544 | A1 | 4/2014 | Riley et al. |
| 2014/0216051 | A1 | 8/2014 | Johnson et al. |
| 2014/0127110 | A1 | 9/2014 | Davis, III et al. |
| 2014/0255145 | A1 | 9/2014 | Miranda et al. |
| 2015/0000939 | A1 | 1/2015 | Willner |
| 2015/0013345 | A1 | 1/2015 | Porter et al. |
| 2015/0377669 | A1 | 12/2015 | DeSilva et al. |

FOREIGN PATENT DOCUMENTS

| | | | |
|---|---|---|---|
| EP | 1832751 | A1 | 9/2007 |
| EP | 1770331 | A3 | 9/2014 |
| GB | 2470253 | A | 11/2010 |
| WO | 8602406 | A1 | 4/1986 |
| WO | 9104395 | A2 | 4/1991 |
| WO | 9727923 | A1 | 8/1997 |
| WO | 2001002242 | A1 | 1/2001 |
| WO | 2006060010 | A1 | 6/2006 |
| WO | 2008127845 | A1 | 10/2008 |
| WO | 2009006249 | A1 | 1/2009 |
| WO | 2010072998 | A1 | 7/2010 |
| WO | 2012030776 | A2 | 3/2012 |
| WO | 2013001361 | A2 | 1/2013 |
| WO | 2014099330 | A1 | 6/2014 |
| WO | 2014178731 | A2 | 11/2014 |
| WO | 2015176902 | A1 | 11/2015 |

OTHER PUBLICATIONS

U.S. Appl. No. 14/983,768, Notice of Allowance dated Sep. 24, 2018, 280848-1 (GEEN-0676-US), 17 pages.

U.S. Appl. No. 14/983,779, Office Action dated Mar. 15, 2018, 283686-1 (GEEN-0743-US), 34 pages.

U.S. Appl. No. 14/983,768, Office Action dated Apr. 4, 2018, 280848-1 (GEEN-0676-US), 32 pages.

U.S. Appl. No. 15/417,579, Office Action dated Mar. 8, 2019, 22 pages.

* cited by examiner

COMBUSTION BYPASS PASSIVE VALVE SYSTEM FOR A GAS TURBINE

CROSS-REFERENCE TO RELATED APPLICATIONS

This application is related to co-pending U.S. application Ser. Nos. 14/983,768, 14/983,774 and 14/983,779, filed on Dec. 30, 2015.

BACKGROUND OF THE INVENTION

The disclosure relates generally to turbomachines, and more particularly, to a combustion bypass passive valve system for a gas turbine.

A gas turbine generally includes a compressor section that produces compressed air that is subsequently heated by burning a fuel in the reaction zone of a combustion section. The hot gas from the combustion section is directed to a turbine section where the hot gas is used to drive a rotor shaft to produce power. The combustion section typically includes a casing that forms a chamber that receives compressor discharge air from the compressor section. A number of combustors typically are disposed in the chamber and receive the compressor discharge air along with the fuel to be burned. A duct connected to the aft end of each combustor directs the hot gas from the combustor to the turbine section.

Due to rising fuel costs and other factors, gas fired power plants that were designed to operate at mostly full power output are now being operated on an intermittent basis. For example, a gas turbine may be used only during the daytime and then taken off line during the nighttime when the power demand is lower.

During load reductions, or "turndowns," combustion systems often must be capable of remaining in emissions compliance down to about fifty percent (50%) of full rated load output, or "base load." In order to maintain acceptable fuel-to-air ratios at the required turndown levels and to control the formation of oxides of nitrogen (NOx) and carbon monoxide (CO), considered atmospheric pollutants, a portion of the compressor discharge air from the compressor section may be bypassed around the combustors.

BRIEF DESCRIPTION OF THE INVENTION

A combustor for a gas turbine, including: a combustor chamber; a casing enclosing the combustor chamber and defining an area therebetween for passing compressor discharge air into the combustor chamber for use in combustion; and at least one passive bypass valve for selectively extracting a portion of the compressor discharge air from the area between the combustor chamber and the casing to adjust a temperature in the combustor.

A system, including: a plurality of combustors, each combustor including: a combustor chamber; a casing enclosing the combustor chamber and defining an area therebetween for passing compressor discharge air into the combustor chamber for use in combustion; and at least one passive bypass valve for selectively extracting a portion of the compressor discharge air from the area between the combustor chamber and the casing to adjust a temperature in the combustor; and a flow-balancing tube interconnecting at least two of the passive bypass valves.

A turbine system comprising: a compressor; a combustor; and a turbine, the combustor further comprising: a combustor chamber; a casing enclosing the combustor chamber and defining an area therebetween for passing air discharged by the compressor into the combustor chamber for use in combustion; and at least one passive bypass valve for selectively extracting a portion of the air discharged from the compressor from the area between the combustor chamber and the casing to adjust a temperature in the combustor.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depicts various embodiments of the disclosure. In the drawings, like numerals refer to like elements.

Figure 1:
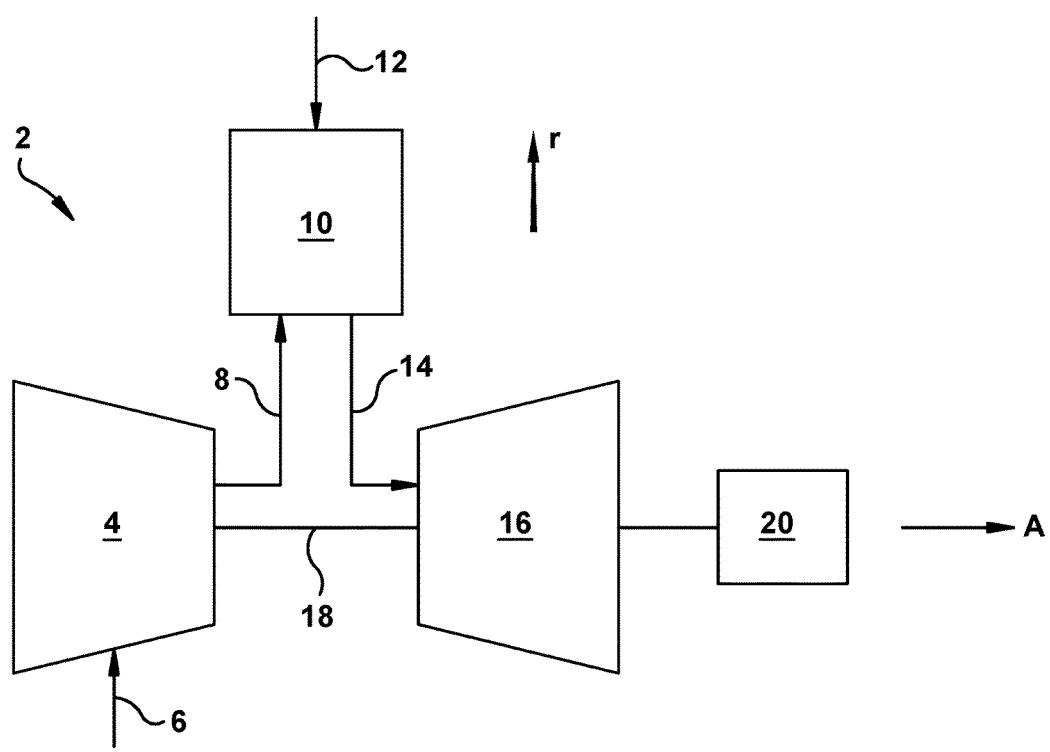
FIG. 1 is a schematic diagram of a gas turbine system according to embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The disclosure relates generally to turbomachines, and more particularly, to a combustion bypass passive valve system for a gas turbine.

In the Figures, for example as shown in FIG. 1, the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

Referring now to the drawings, FIG. 1 shows a schematic view of a gas turbine system 2 as may be used herein. The gas turbine system 2 includes a compressor section 4 for compressing an incoming flow of air 6. The compressor section 4 delivers a flow of compressed air 8 to a combustion section 10. The combustion section 10 mixes the flow of compressed air 8 with a pressurized flow of fuel 12 and ignites the mixture to create a flow of combustion gases 14. The flow of combustion gases 14 is in turn delivered to a turbine section 16. The flow of combustion gases 14 drives the turbine section 16 to produce mechanical work. The mechanical work produced in the turbine section 16 drives the compressor section 4 via a shaft 18, and may be used to drive an external load 20, such as an electrical generator and/or the like.

Figure 2:
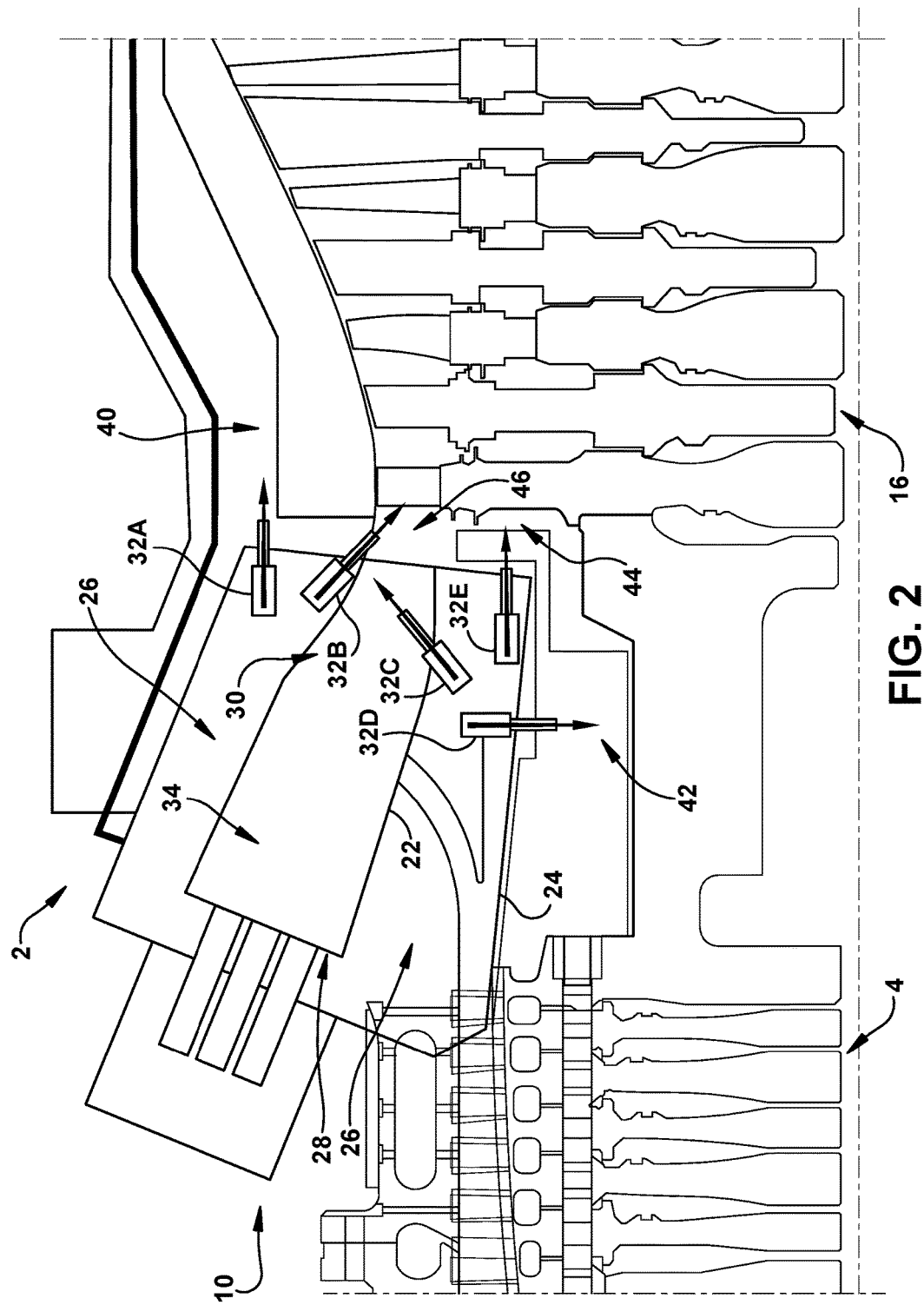
FIG. 2 is a cross-sectional illustration of a combustor section of a gas turbine system according to embodiments.

FIG. 2 depicts a cross-sectional illustration of a combustor section 10 of a gas turbine system 2 according to embodiments. The compressor section 4 and turbine section 16 are partially shown to the left and right, respectively, of the combustor section 10.

The combustor section 10 of the gas turbine system 2 may include a combustor chamber 22 enclosed within a compressor discharge casing (CDC) 24. Generally described, the area located between the combustor chamber 22 and the compressor discharge casing 24, referred herein as the CDC volume 26, receives compressed air discharged from the compressor section 4. The CDC volume 26 between the combustor chamber 22 and the compressor discharge casing 24 directs the compressor discharge air to a head end 28 of the combustor chamber 22. The combustor chamber 22 further includes a reaction zone 34 for the primary combustion of fuel. The fuel and compressed air generally are introduced to the reaction zone 34 where they combust to form a hot gas. A transition duct 30 at the aft end of the combustor chamber 22 directs the hot gas from the reaction zone 34 to the turbine section 16 where the hot gas may be used to drive a rotor shaft to produce power.

A common range of combustion gas stream temperatures is approximately 2400° F. to 2600° F. In some gas turbine systems, a lower temperature limit may exist due to the ability of the combustor section to completely burn fuel at low temperatures. When the combustion process is not completed, high levels of carbon-monoxide (CO) may exist in the turbine exhaust system.

Typically, when a gas turbine system is operated at a high load, the temperature in the reaction zone 34 (TRZ) is high and CO emissions are held to a minimum. As the load of the gas turbine system decreases, however, it is often necessary to reduce TRZ, which may result in increased CO emissions.

During combustion, at least some of the parameters necessary to meet desired emissions limits are substantially controlled within the combustor component 10. It has been determined that the temperature of the combustion process plays a role in whether or not a gas turbine system meets desired emissions limits. TRZ, for example, has a strong correlation to emissions output, in that, if TRZ falls below a certain level, the emissions quickly increase.

TRZ depends on factors such as air flow and fuel flow, for example. For a given amount of fuel flow, TRZ may be increased by decreasing the flow of air entering the reaction zone 34 of the combustor component 10 via the CDC volume 26. The air flow entering the reaction zone 34 through the CDC volume 26 may be decreased by extracting air from the CDC volume 26, thereby bypassing the reaction zone 34.

According to embodiments, as shown in FIG. 2, at least one passive bypass valve 32 may be provided for bypassing air, extracted from the CDC volume 26, around the combustor section 10 of the gas turbine system 2. Such bypassing may be used, for example, to improve partial load (part-load) emissions and turndown. Each passive bypass valve 32 is configured to open at low-load conditions and close at high-load conditions, providing bypass air when needed, but maintaining maximum air flow to the reaction zone 34 when combustion temperature is high.

Each passive bypass valve 32 may be sensitive, for example, to temperature (e.g., the compressor discharge temperature (TCD) or other temperature indicative of load) or pressure, such as a differential pressure between the compressor discharge pressure (POD) and the combustor chamber pressure (PCC) or a differential pressure between the PCD and a cooling circuit supply pressure. As presented in detail below, the bypassed air can be discharged through a passive bypass valve 32 to any of a number of downstream locations. Generally, the closer the downstream location is to the combustor discharge, the lower the impact to part-load efficiency. Although five passive bypass valves 32A-32E are shown in FIG. 2, in general, any number of passive bypass valves 32 may be used. Further, although the passive bypass valves 32A-32E are shown as positioned in particular locations in FIG. 2, these locations are for descriptive purposes only; other suitable locations may be available in a gas turbine system for bypassing air around a section (e.g., combustor section) of the gas turbine system.

According to embodiments, one passive bypass valve 32 or a plurality of passive bypass valves 32 (e.g., 32A-32E) in parallel may be provided in the combustor component 10, where each passive bypass valve 32 is configured to be closed for near base-load conditions, and open or partially-open at part-load conditions. The passive bypass valves 32 are configured to be open while the combustion temperature is still high enough that CO and unburned hydrocarbon (UHC) emissions are in compliance, yet not so high that the increase in combustion temperature when the passive bypass valves 32 are open will drive NOx emissions out of compliance.

When a plurality of the passive bypass valves 32 are used, the passive bypass valves 32 may be configured to have different opening/closing set points. This ensures that any temperature change resulting from the opening of each individual passive bypass valve 32 does not create a significant disturbance to the operation of the gas turbine system 2. In a multi-can gas turbine system (see, e.g., FIG. 7), the plurality of passive bypass valves 32 may be synchronized or flow-balanced to prevent excessive combustor-to-combustor variation in combustion temperature, or continuous crossfire.

According to embodiments, as the name indicates, a passive bypass valve 32 is passively actuated. In other words, no control connections and no sensor signals are required. For example, a passive bypass valve 32 may be passively actuated via the expansion of a temperature-sensitive fluid coupled to a movable piston. The sensed temperature can be the compressor discharge temperature (TCD), for example, which is a relatively good indicator of load level, with some variation with ambient temperature.

Figure 3:
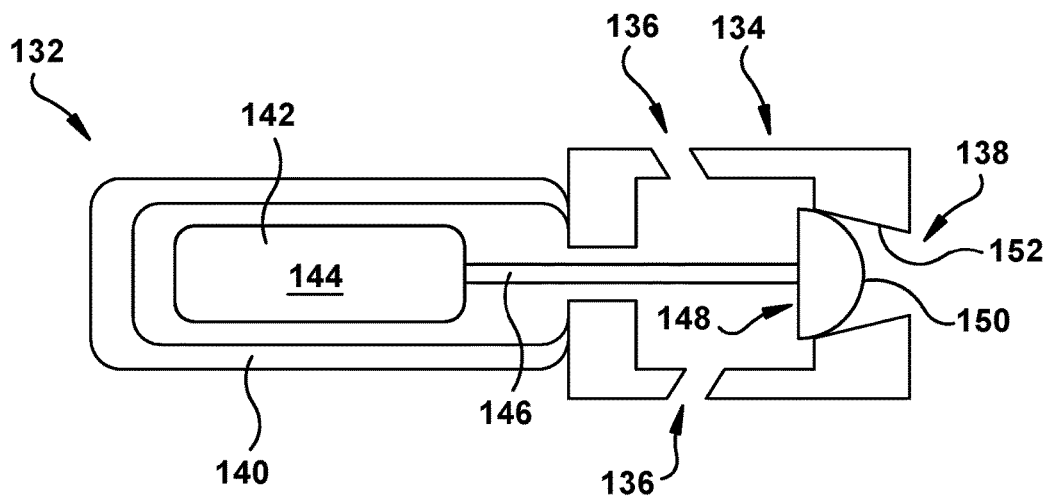
FIG. 3 depicts a temperature-sensitive passive bypass valve in a closed configuration, according to embodiments.
Figure 4:
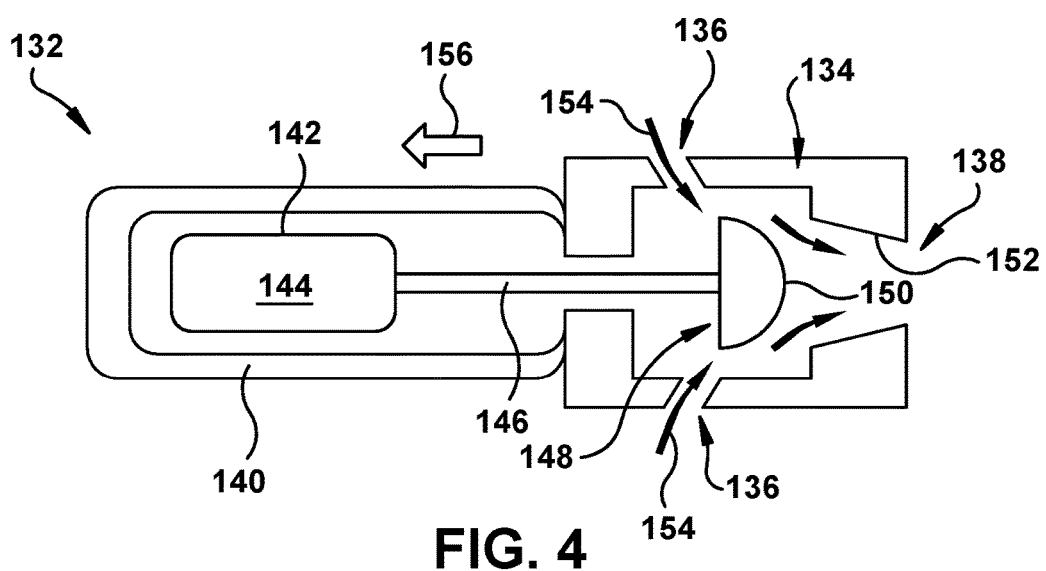
FIG. 4 depicts the temperature-sensitive passive bypass valve of FIG. 3 in an open configuration, according to embodiments.

A temperature-sensitive version 132 of a passive bypass valve 32 according to embodiments is depicted in FIGS. 3 and 4. The temperature-sensitive passive bypass valve 132 is depicted in a closed configuration in FIG. 3 and in an open configuration in FIG. 4. Any other suitable temperature-sensitive passive bypass valve 132 capable of providing the functionality described herein may also be used.

The temperature-sensitive passive bypass valve 132 includes a valve section 134 including one or more gas flow inlet ports 136 and a gas flow outlet port 138. The temperature-sensitive passive bypass valve 132 further includes a housing 140 enclosing a bellows or other expandable element 142 containing a thermally expandable material 144. The thermally expandable material 144 may include, for example, a silicon heat transfer fluid. Any other suitable thermally expandable material 144 capable of providing the functionality described herein may also be used.

The expandable element 142 is coupled to a rod 146. A valve disc 148 is provided at a distal end of the rod 146. As depicted in FIG. 3, the valve disc 148 has an outer surface 150. Other suitable configurations of the valve disc 148 capable of providing the functionality described herein may also be used.

The temperature-sensitive passive bypass valve 132 is shown in a closed configuration in FIG. 3. In the closed configuration, the surface 150 of the valve disc 148 sealingly engages a complementary (e.g., conical) valve seat 152 formed adjacent the gas flow outlet port 138. In general, the valve disc 148 and valve seat 152 may have any suitable configuration capable of forming a seal to prevent the flow of gas through the gas flow outlet port 138. In the closed configuration, a flow of air 154 (FIG. 4) is prevented from flowing from the gas flow inlet ports 136 through the gas flow outlet port 138 into a downstream location.

Referring now to FIG. 4, a decrease in temperature (e.g., a decrease in TCD) at the temperature-sensitive passive bypass valve 132 causes a contraction of the thermally expandable material 144 within the expandable element 142. This causes the expandable element 142 to contract within the housing 140 as indicated by arrow 156, forcing the rod 146 and valve disc 148 laterally away from the valve seat 152 and the gas flow outlet port 138. When the surface 150 of the valve disc 148 no longer forms a seal against the valve seat 152, a flow of air 154 flows from the gas flow inlet ports 136 through the gas flow outlet port 138 and into a downstream location.

Different thermally expandable materials 144 may be used in different temperature-sensitive passive bypass valves 132 to provide different coefficients of thermal expansion. This provides, for example, different opening/closing temperature set points for different temperature-sensitive passive bypass valves 132. This helps to ensure that any temperature change resulting from the opening of one or more individual temperature-sensitive passive bypass valves 132 does not create a significant disturbance to operation of the gas turbine system 2.

Figure 5:
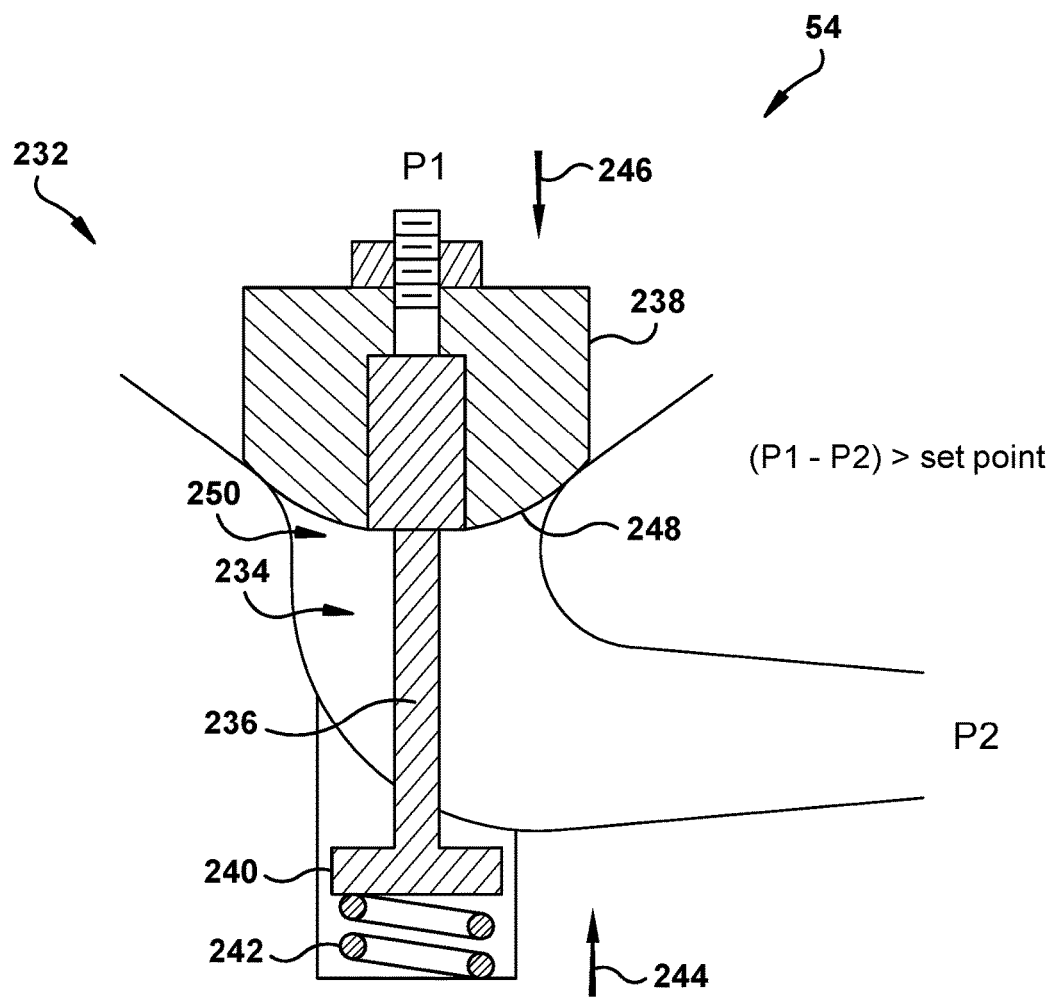
FIG. 5 depicts a pressure-sensitive passive bypass valve in a closed configuration, according to embodiments.
Figure 6:
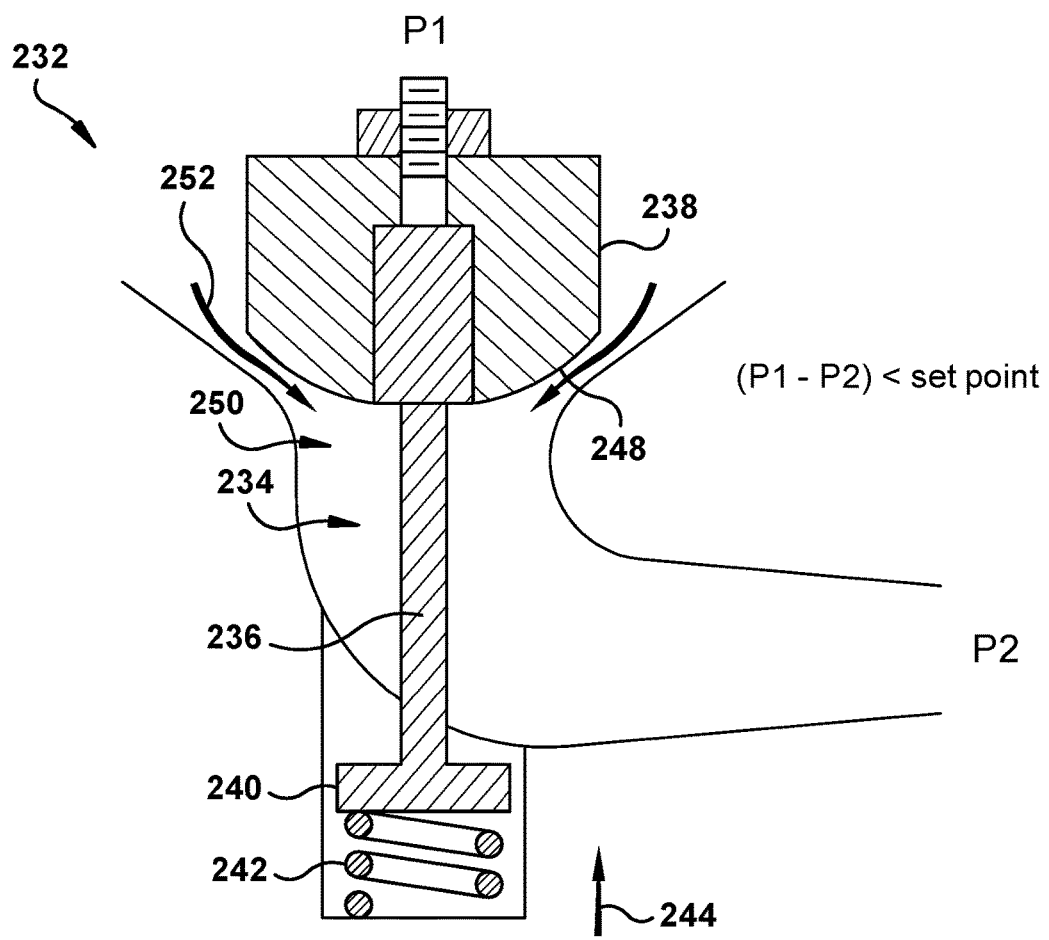
FIG. 6 depicts the pressure-sensitive passive bypass valve of FIG. 5 in an open configuration, according to embodiments.

A pressure-sensitive version 232 of a passive bypass valve 32 according to embodiments is depicted in FIGS. 5 and 6. The pressure-sensitive passive bypass valve 232 is depicted in a closed configuration in FIG. 5 and in an open configuration in FIG. 6. Any other suitable pressure-sensitive passive bypass valve 232 capable of providing the functionality described herein may also be used.

The pressure-sensitive passive bypass valve 232 is configured to be closed at high pressure and open at low pressure. The differential pressure P1-P2 is the primary "sensed" pressure. P1 may be PCD, while P2 may be PCC, the pressure in a wheelspace or other area of the turbine component 16, the pressure in a cooling circuit of the turbine component 16, the pressure in an extraction cavity, and/or the like. The differential pressure P1-P2 increases roughly in proportion to load of the gas turbine system 2.

According to embodiments, as shown in FIGS. 5 and 6, the pressure-sensitive passive bypass valve 232 may include a spring-biased piston structure 234. The pressure-sensitive passive bypass valve 232 may be subject to hysteresis, which may be a useful feature to prevent control instability, so long as the hysteresis band is not too wide.

As shown in FIGS. 5 and 6, the spring-biased piston structure 234 includes a piston 236, a valve disc 238 coupled to a first end of the piston 236, and an enlarged end section 240 coupled to an opposite end of the piston 236. A biasing element 242 (e.g., a spring), biases the piston 236 in direction 244. In FIG. 5, P1-P2 exceeds a set point pressure, which forces the valve disc 238 in direction 246 until a surface 248 of the valve disc 238 seals an opening 250 between the areas at pressures P1 and P2, preventing a flow of gas from the area at pressure P1 to the area at pressure P2. In FIG. 6, P1-P2 is less than a set point pressure and is insufficient to overcome the biasing force in direction 244 provided by the biasing element 242. In this case, the biasing element 242 displaces the piston 236 in direction 244, forcing the surface 248 of the valve disc 238 away from the opening 250, thereby allowing air 252 to flow through the opening 250 from the area at pressure P1 to the area at pressure P2.

The biasing elements 242 in different pressure-sensitive passive bypass valves 232 may have different biases. Different biases may be used, for example, to select different opening/closing pressure set points for different pressure-sensitive passive bypass valves 232. This may ensure that any temperature change resulting from the opening of one or more individual pressure-sensitive passive bypass valves 232 does not create a significant disturbance to operation of the gas turbine system 2.

A plurality of passive bypass valves 32A-32E are shown in FIG. 2. In the depicted embodiment, the bypass valve 32A is positioned between the CDC volume 26 and a nozzle cooling circuit 40 (e.g., a stage 2 nozzle cooling circuit) in the turbine component 16. The bypass valve 32D is positioned between the CDC volume 26 and a rotor midsection 42. The bypass valve 32E is positioned between the CDC volume 26 and a wheelspace 44 (e.g., a first forward wheelspace) of the turbine component 16.

The bypass valve 32B is positioned between the CDC volume 26 and the throat area 46 of a nozzle (e.g., a stage 1 nozzle) of the turbine component 16. Any air passing through the bypass valve 32B may offset lost efficiency due to removal of air from the CDC volume 26. Lastly, the bypass valve 32C, which is positioned from the CDC volume 26 into the transition duct 30, provides a valved dilution hole in the combustor component 10.

As described above, in general, any number of passive bypass valves 32 may be used. Further, although the passive bypass valves 32A-32E are shown as disposed in particular locations in FIG. 2, these locations are for descriptive purposes only; other suitable locations may be available in a gas turbine system for bypassing air around a combustor section.

The use of passive bypass valve(s) provides numerous advantages including, for example:
  passive bypass valves and the components thereof are not excessively large or expensive, and can be developed more quickly;
  the smaller masses of passive bypass valves are easier to deal with when it comes to supporting, moving, bearing loads, spring balance, etc., within a high-temperature environment;
  the incremental flow from opening or closing individual passive bypass valves will not represent a big discrete step change in combustion temperature, for which a control system would struggle to manage stability, load perturbations, emissions, etc.;
  a large number of passive bypass valves can be actuated over a range of temperatures or pressures to effect a "soft" change in total combustor effective area.

In a multi-can system 50 (FIG. 7), each individual passive bypass valve 32 (if mounted on the combustor in a can 52)

would primarily affect the flow in that can 52—assuming a can-type combustion system. For example, the somewhat random, uncontrolled sequencing of multiple passive bypass valves 32 could be problematic for temperature spreads or individual-can temperature and flame stability.

Figure 7:
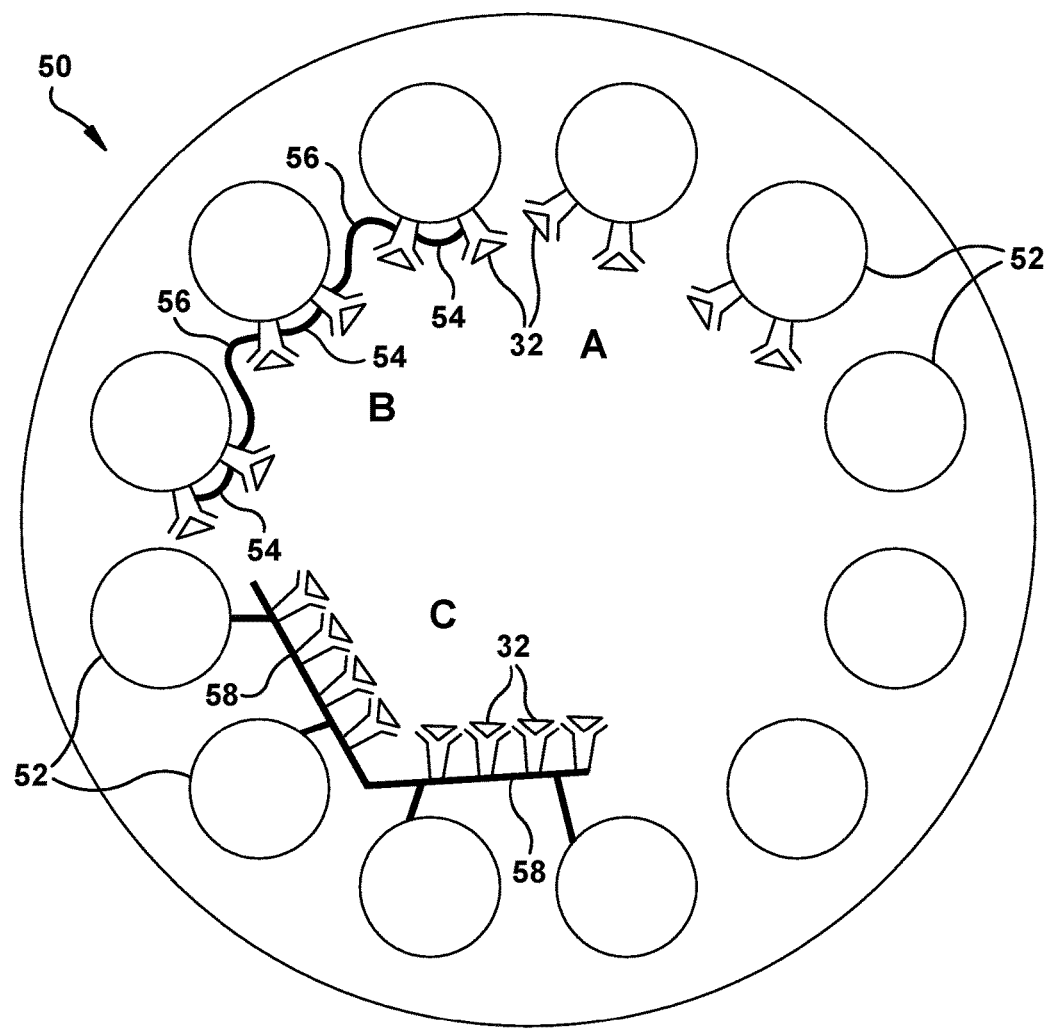
FIG. 7 depicts a multi-can system including various arrangements of passive bypass valves, according to embodiments.

To combat such a potential problem, as shown in FIG. 7, individual passive bypass valves 32 may be interconnected with flow-balancing tubes 54 downstream of the passive bypass valve 32. The flow-balancing tubes 54 balance the flow around an individual can 52. When a single passive bypass valve 32 closes while all other adjacent passive bypass valves 32 are open, the balancing tubes 54 draw air from the open passive bypass valves 32 to make up the air that is blocked by the closed passive bypass valve 32, keeping positive flow present despite the closed passive bypasse valve 32.

Flow balancing tubes 56 may be used to balance can 52 to can 52 flow differences. The flow from one passive bypass valve 32 may be distributed over several cans 52 via the flow balancing tubes 56. When a passive bypass valve 32 opens while all the adjacent passive bypass valves 32 are closed, its air discharges not only into the can 52 to which it is attached, but into the adjacent cans 52 connected by flow balancing tubes 56 as well.

There are several different configurations of flow balancing tubes 54, 56 shown in FIG. 7: group "A" represents individual cans 52 with passive bypass valves 32 attached; group "B" represents flow balancing between passive bypass valves 32 and cans 52; and group "C" represents a modularized system with passive bypass valves 32 interconnected to each other and to multiple cans 52 via a manifold 58.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor for a gas turbine, comprising:
   a combustor chamber;
   a compressor discharge casing (CDC) enclosing the combustor chamber and defining a CDC volume therebetween for passing compressor discharge air into the combustor chamber for use in combustion; and
   a plurality of passive bypass valves for selectively extracting a portion of the compressor discharge air from the CDC volume between the combustor chamber and the compressor discharge casing to adjust a temperature in the combustor,
   wherein a first of the plurality of passive bypass valves is positioned between the CDC volume and a nozzle of a turbine component of the gas turbine, and wherein a second of the plurality of passive bypass valves is positioned between the CDC volume and a transition duct at a downstream end of the combustor chamber.

2. The combustor according to claim 1, wherein at least one of the plurality of passive bypass valves comprises a temperature-sensitive passive bypass valve.

3. The combustor according to claim 2, wherein each temperature-sensitive passive bypass valve is configured to open and close based on a temperature of air flowing within the gas turbine.

4. The combustor according to claim 3, wherein each temperature-sensitive passive bypass valve is configured to open and close based on the temperature of the compressor discharge air.

5. The combustor according to claim 2, wherein the plurality of passive bypass valves are configured to open and close at different set points.

6. The combustor according to claim 1, wherein the at least one passive bypass valve comprises a pressure-sensitive passive bypass valve.

7. The combustor according to claim 6, wherein each pressure-sensitive passive bypass valve is configured to open and close based on a pressure difference between a location within the combustor and a second location.

8. The combustor according to claim 7, wherein the location within the combustor includes the CDC volume.

9. The combustor according to claim 7, wherein the second location is a location selected from the group consisting of the transition duct, a wheelspace, a rotor midsection, the nozzle, and a cooling circuit.

10. The combustor according to claim 6, further including a plurality of the pressure-sensitive passive bypass valves each configured to open and close at a different set point.

11. A system, comprising:
    a plurality of combustors, each of the plurality of combustors including:
    a combustor chamber;
    a compressor discharge casing (CDC) enclosing the combustor chamber and defining a CDC volume therebetween for passing compressor discharge air into the combustor chamber for use in combustion; and a plurality of passive bypass valves for selectively extracting a portion of the compressor discharge air from the CDC volume between the combustor chamber and the compressor discharge casing to adjust a temperature in the combustor; and a flow-balancing tube fluidly coupling at least one of the plurality of passive bypass valves of a first combustor of the plurality of combustors with at least one of the plurality of passive bypass valves of a second combustor of the plurality of combustors.

12. The system according to claim 11, further including:
a manifold interconnecting all of the plurality of passive bypass valves of one of the combustors of the plurality of combustors with all of the plurality of passive bypass valves of another combustor of the plurality of combustors.

13. The system according to claim 11, wherein each passive bypass valve is selected from the group comprising: a temperature-sensitive passive bypass valve and a pressure sensitive bypass valve.

14. A turbine system comprising:
a compressor;
a plurality of combustors; and
a turbine,
each of the plurality of combustors further comprising:
a combustor chamber;
a compressor discharge casing (CDC) enclosing the combustor chamber and defining a CDC volume therebetween for passing air discharged by the compressor into the combustor chamber for use in combustion; and a plurality of passive bypass valves for selectively extracting a portion of the air discharged from the compressor from the CDC volume between the combustor chamber and the compressor discharge casing to adjust a temperature in the combustor; and a flow-balancing tube fluidly coupling at least one of the plurality of passive bypass valves of a first combustor of the plurality of combustors with at least one of the plurality of passive bypass valves of a second combustor of the plurality of combustors.

15. The turbine system according to claim 14, wherein at least one of the plurality of passive bypass valves comprises a temperature-sensitive passive bypass valve, and wherein the temperature-sensitive passive bypass valve is configured to open and close based on a temperature of air flowing in the turbine system.

16. The turbine system according to claim 14, further including a manifold interconnecting all of the plurality of passive bypass valves of one of the combustors of the plurality of combustors with all of the plurality of passive bypass valves of another combustor of the plurality of combustors.

* * * * *